Dec. 6, 1927.

A. J. EVERS 1,651,877

PASTEBOARD BOX MAKING MACHINE

Filed Sept. 25, 1926    6 Sheets-Sheet 1

Dec. 6, 1927.  
A. J. EVERS  
PASTEBOARD BOX MAKING MACHINE  
Filed Sept. 25, 1926  
1,651,877  
6 Sheets-Sheet 2

Inventor:  
Arthur J. Evers  
By Walter M. Fuller Atty.

Dec. 6, 1927.
A. J. EVERS
1,651,877
PASTEBOARD BOX MAKING MACHINE
Filed Sept. 25, 1926 6 Sheets-Sheet 3
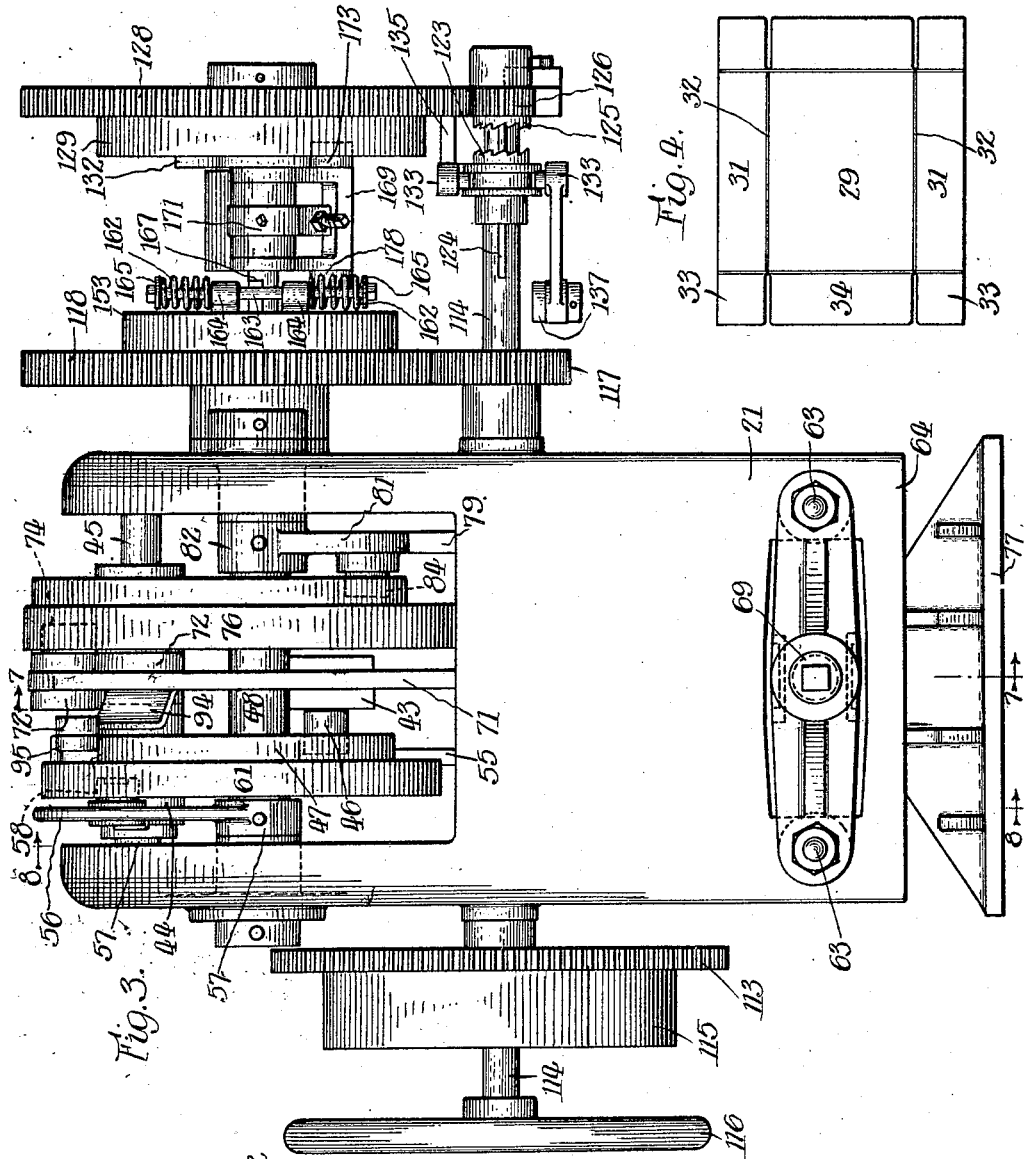
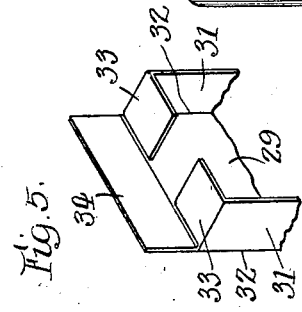
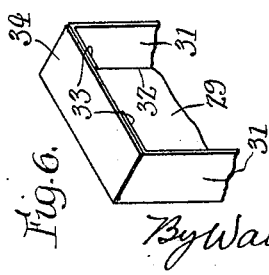
Inventor:
Arthur J. Evers
By Walter M. Fuller
Atty.

Dec. 6, 1927.  
A. J. EVERS  
1,651,877  
PASTEBOARD BOX MAKING MACHINE  
Filed Sept. 25, 1926   6 Sheets-Sheet 4

Inventor:
Arthur J. Evers
By Walter M. Fuller
Atty.

Dec. 6, 1927.  1,651,877
A. J. EVERS
PASTEBOARD BOX MAKING MACHINE
Filed Sept. 25, 1926   6 Sheets-Sheet 5

Inventor:
Arthur J. Evers
By Walter M. Fuller
Atty.

Dec. 6, 1927.  
A. J. EVERS  
1,651,877  
PASTEBOARD BOX MAKING MACHINE  
Filed Sept. 25, 1926  6 Sheets-Sheet 6
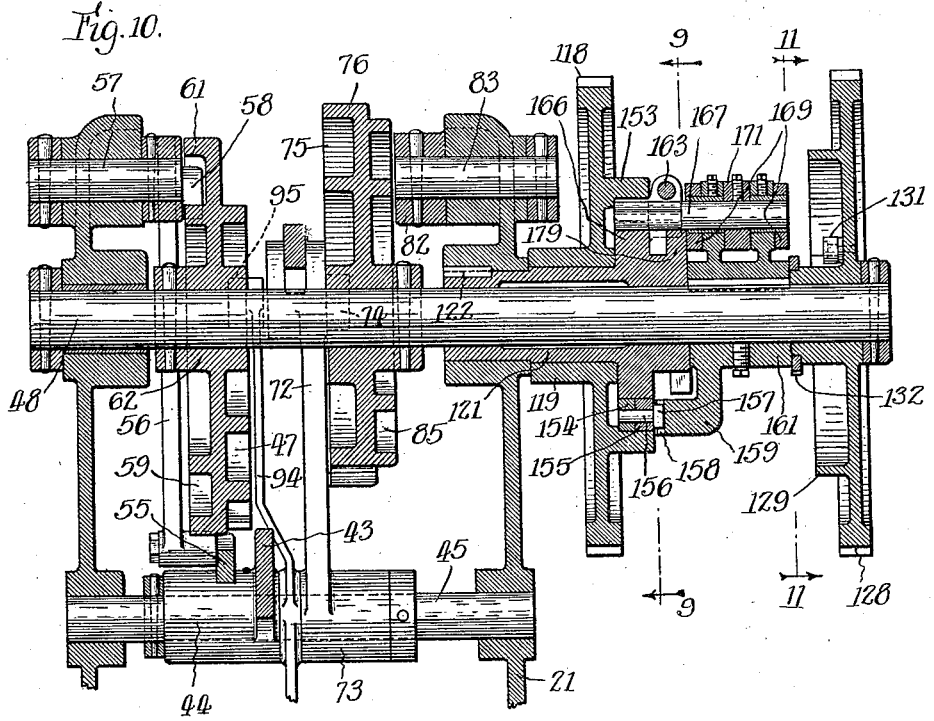
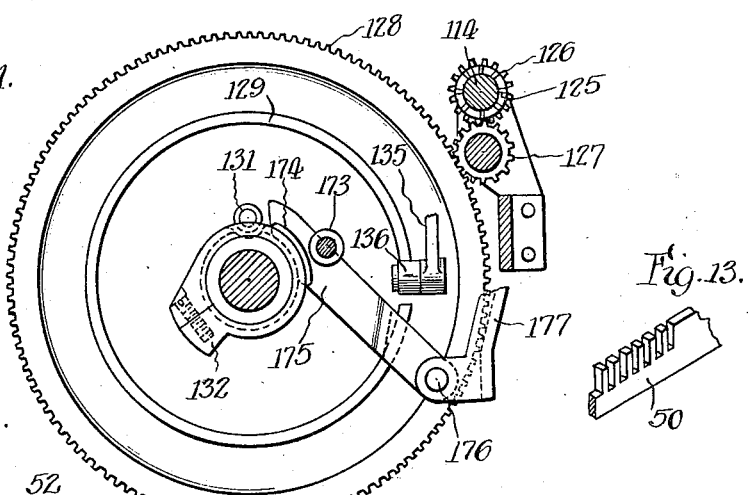
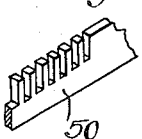
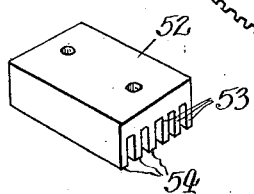
Inventor:  
Arthur J. Evers  
By Walter M. Fuller Atty.

Patented Dec. 6, 1927.

1,651,877

UNITED STATES PATENT OFFICE.

ARTHUR J. EVERS, OF CHICAGO, ILLINOIS, ASSIGNOR TO SELF LOCKING MACHINE COMPANY, OF CHICAGO, ILLINOIS, A CORPORATION OF ILLINOIS.

PASTEBOARD-BOX-MAKING MACHINE.

Application filed September 25, 1926. Serial No. 137,655.

My invention concerns certain features of novelty and advantage, both structural and functional, in pasteboard box manufacturing machines and similar appliances.

One aim of the invention is the production of a machine of this type which is simple in structure, easily operated, and comparatively economical to produce, whereby the manufacturer of the goods to be accommodated or shipped in the boxes can with advantage have one or more of the machines producing boxes in his plant, rather than buy the boxes already made, which necessitates much space for their shipment, from the manufacturing establishment, and which does away with folding boxes which have several unsatisfactory characteristics.

With this general object in view, the machine has been designed to meet the particular needs of the service which it is intended to perform and which will be made clear from the following detailed description of a preferred embodiment of the invention which has also been illustrated in the several views of the accompanying drawings constituting a part of this specification and throughout the plurality of views of which like reference characters have been employed to designate the same parts.

In these drawings:

Figure 3 is a top plan view of the mechanism;

Figures 4, 5 and 6 illustrate the pasteboard blank and the folding operations performed thereon;

Figure 10 is a longitudinal section through the back cam shaft;

Figure 11 is a cross-section on line 11—11 of Figure 10;

Figure 12 is a perspective view of one of the devices for applying adhesive to the blanks; and Figure 13 is a perspective view of the rubber or flexible comb for wiping the adhesive applying device.

Figure 2:
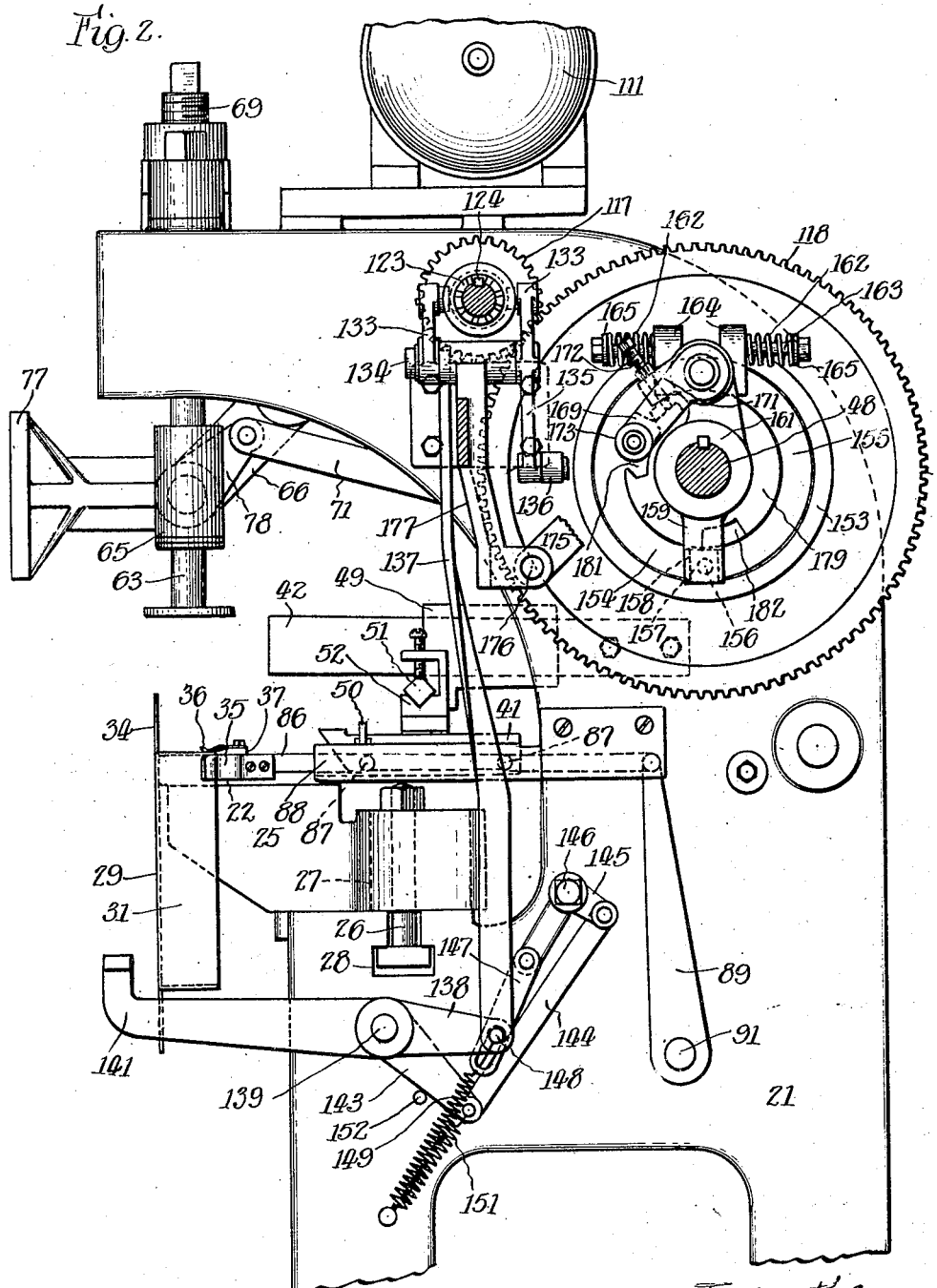
Figure 2 is an enlarged, vertical cross-section on line 2—2 of Figure 1.
Figure 7:
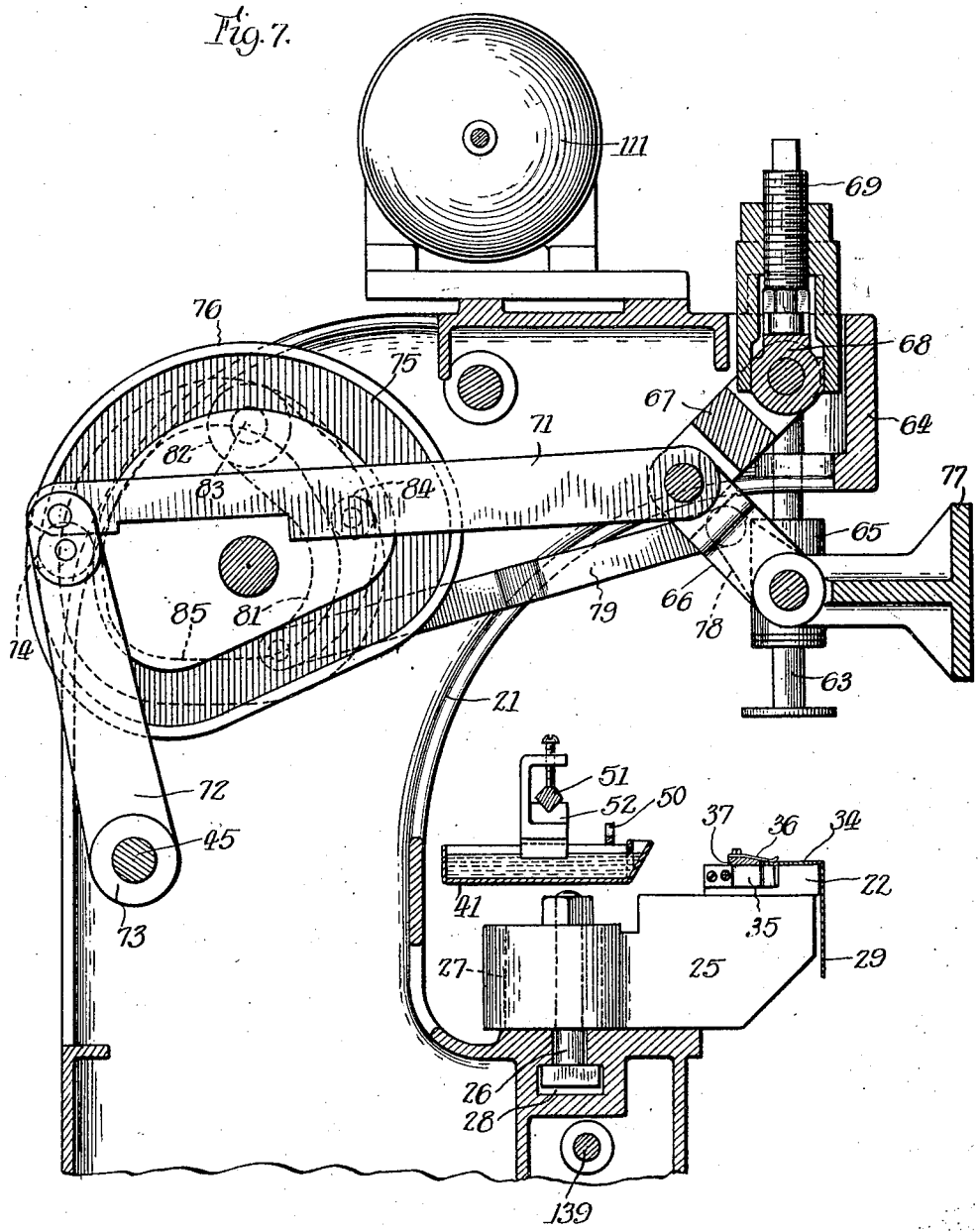
Figure 7 is a vertical cross-section on line 7—7 of Figure 3.
Figure 8:
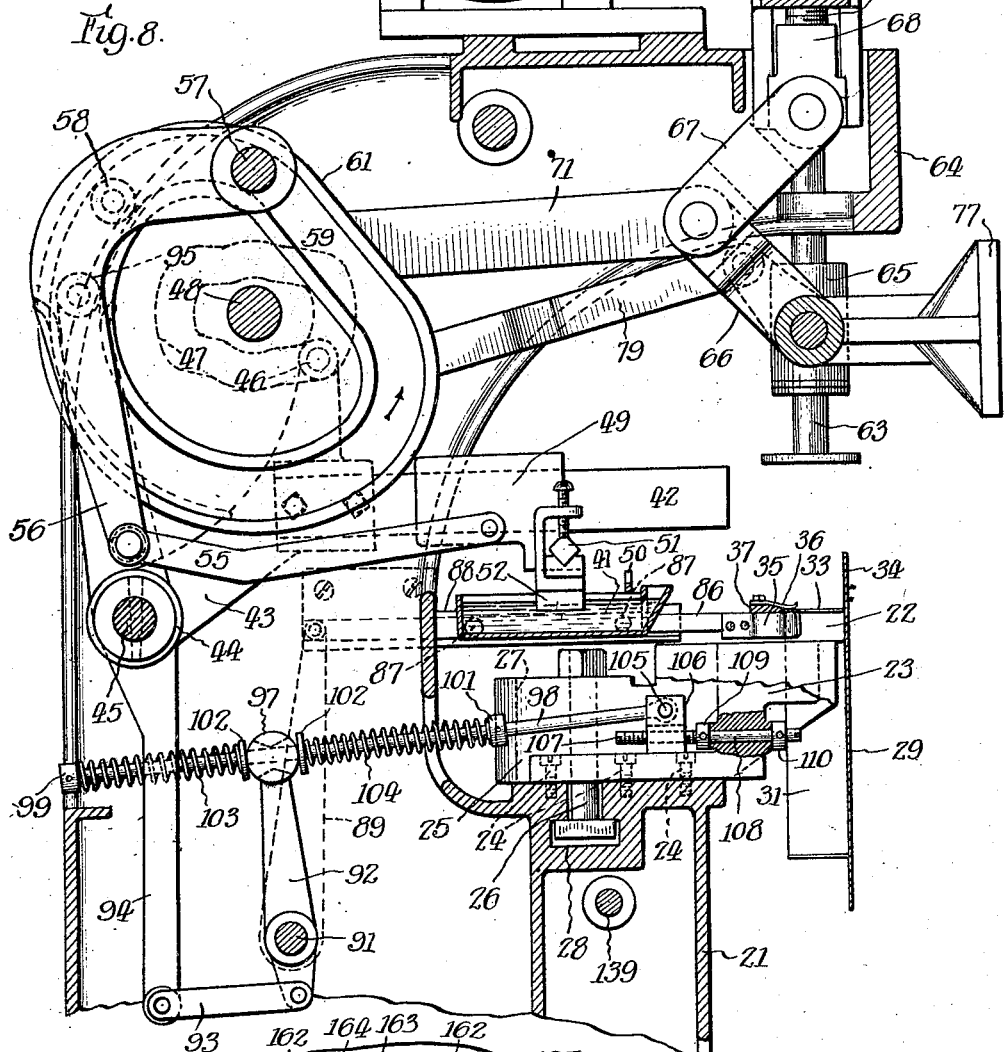
Figure 8 is a similar section on line 8—8 of Figure 3.

By reference to these drawings, it will be seen that the machine includes a suitable frame 21 of irregular shape on which a horizontal form-block 22 is adjustably mounted being supported on a central block 23 secured to a flat, horizontal surface of the frame by a plurality of screws 24, 24, Figure 8, and on a pair of end-blocks 25, 25, each being adjustably fastened on the same flat surface of the main-frame by a bolt 26 extended upwardly through a slot 27 in the block and having its head in an undercut groove 28 of the frame, Figures 2 and 7.

Obviously, the former or form-block 22 may be easily replaced by another of different size when required for the manufacture of boxes of other dimensions.

When one end of the scored and cut pasteboard blank 29 is applied manually to the form-block, its side-wings 31, 31 are bent along the parallel folding lines 32, 32 and the two end ears or flaps 33, 33 at one end of the blank are folded over by hand leaving the corresponding, intermediate, end flap 34 standing upright as shown in Figures 2, 3 7 and 8.

When such blank is thus folded and applied by hand to the form-block, the side-wings 31, 31 are inserted between the opposite sides of the form-block and slightly-flaring leaf-springs 35, 35 mounted thereon, the springs performing the function of retainers to hold the bent wings in position against the faces of the form.

Also, when the bent blank is thus placed on the form, the inner edges of the pair of oppositely-disposed ears or tabs 33, 33 are introduced beneath springs 36, 36 mounted on and projecting forwardly from a stripper-bar 37.

Hence all of the hand-bent parts of the blanks are properly held in place against the form.

It is necessary to apply a suitable quantity of adhesive, preferably in separated bands or strips, to the top surfaces of the corner tabs 33, 33, to bend over the wing 34 on to such coated parts, to apply adequate pressure for a suitable length of time to the then superposed sections of the box blank to obtain their firm and secure adhesion, and then to discharge or strip the box from the form, whereupon the opposite end of the blank is treated in the same manner to complete the finished box.

To perform these adhesive-applying, wing-folding and pressing and box-discharging operations, the following specified cooperating mechanical instrumentalities have been provided.

Referring first to the means for applying the adhesive on the tabs, it will be perceived that directly back of the form-block 22, a pan 41 is provided to contain the supply of adhesive, such as paste or glue.

Above this, a bar 42 has its rear end fixedly mounted in a socket of an arm 43 (Figure 8) whose hub 44 (Figure 10) is rockingly mounted on a shaft 45 suitably supported in the frame, such rock-arm having a roller 46 cooperating with a cam 47 mounted on a rotary shaft 48 revolved by means hereinafter described.

Bar 42 acts as a support or guide for a carriage 49 slidable lengthwise thereon and carrying a cross-bar 51 on which are adjustably mounted two, adhesive-applying blocks 52, 52 in register with the bent-over tabs 33, 33 on the form-block.

Each such member 52 has on its under face a plurality of grooves 53, 53 with blade-like projections 54, 54 between them (see Figure 12), the bottom faces only of the blades being used to carry the adhesive to and apply it to the blank tabs 33, 33.

As will be explained hereinafter, a rubber or other flexible comb 50 is so positioned and shaped as to wipe all of the adhesive off of such block except that present on the under-faces of the blades.

The reciprocatory block or carriage 49 is connected by a bent link 55 to the lower end of a bent lever 56 fulcrumed on the inside of the frame at 57, the member 56 having a roller 58 in a cam groove 59 in the side of a cam 61, the hub 62 of which is pinned to and rotatable with the cam-shaft 48.

From the above, it will be clear that cam groove 59 causes the forward and back movement of the adhesive appliers 52, 52 and that cam groove 47 requires such members to rise and descend as is needed to permit them to enter and leave the adhesive vessel 41 and to deposit the transported adhesive on the folded blank tabs and not wipe it off on receding from them.

Turning now to the mechanism for folding over the blank wing 34 on to the coated corner tabs 33, 33 and for pressing it firmly on to them to insure proper adhesion of the parts together, it will be seen that two, vertical, cylindrical guides 63, 63 depend from a front, top, overhanging part 64 of the machine frame and that on these a carriage 65 is adapted to slide vertically, the reciprocation thereof being effected by a toggle 66, 67, the lower link 66 of which is rockingly mounted on the carriage, whereas the companion, upper link 67 is hinged to a block 68 slidingly adjustable vertically in the frame by a screw 69 provided for that purpose, whereby the degree of pressure can be easily regulated and the machine adjusted with facility for use with stock of different dimensions or thicknesses.

Such toggle is actuated by means of a link 71 connected to its knee and to a rock-arm 72 whose hub 73 is fulcrumed on shaft 45, the arm being equipped with a roller 74 in a cam groove 75 of cam 76 pinned on shaft 48.

Carriage 65 has a presser 77 hinged thereto or rockingly mounted thereon, so that during its turning action, it may fold or bend over the flap 34 and by its bodily downward travel, produced by the toggle, it may apply proper pressure to obtain the required cementing of the box blank parts together.

Such presser has an arm 78 integral therewith or fixed thereon and the end of such arm is connected by a link 79 to the lower end of a curved arm 81 whose hub 82 is fulcrumed at 83 on the frame, an intermediate part of such rock-arm having a roller 84 in a cam groove 85 in one face of cam 76 hereinabove referred to.

The one cam rocks the presser and the other forces it down, after having been rocked into position, by the toggle mechanism.

The stripper-bar 37 is mounted on two side bars 86, 86 equipped with rollers 87, 87 traveling in grooves on the inner faces of a pair of supports 88, 88, the rear ends of such bars being connected to a pair of upstanding arms 89, 89 on a rock-shaft 91 appropriately journaled in the main-frame and having a lever or arm 92 secured thereto (Figure 8) the lower end of which is connected by a link 93 to the bottom end of a lever 94 fulcrumed on shaft 45 and the top end of which has a roller 95 in an outer cam surface in one side of cam 61.

This stripper-bar is adjustable as to its intermediate position but not as to the total length of its stroke, so that it can be readily used with boxes of different sizes.

To this end, the upper part of arm 92 has a double-flaring socket member 97 of external ball shape through which a rod 98 extends, the latter being fitted with two collars 99 and 101 fixed thereon, and between these collars and two washers 102, 102 bearing on opposite sides of the globular-shaped socketed part 97 of the lever are two coiled springs 103 and 104 enclosing the rod and bearing at their opposite ends on the collars and washers respectively.

These two springs are always exactly balanced and the position of the stripper-bar 37, therefore, depends upon the adjusted position of rod 98, one end of which, at 105, is hinged to a flat nut block 106 resting on and adjustably slidable on the top face of the base of element 23 (Figure 8), a screw 107 having threaded engagement with a screw-threaded hole through the block, the screw having an unthreaded section 108 revoluble in a bearing in block 23 and prevented from lengthwise movement therein by confining collars 109 and 110, the front protruding end of the screw-shaft being transversely slotted for the accommodation of the end of a screw-driver.

Hence, by turning screw 107, the position of the stripper-bar may be adjusted to conform to the different sizes of box blanks.

This action is permitted because that portion of the cam groove in which roller 95 is located when the stripper is idle, is sufficiently wide or wholly omitted to permit such adjustment, but the stripper will always travel the same distance regardless of its adjustment.

Considering now the driving mechanism which is somewhat peculiar because it is automatically thrown out of action for a period of time while the presser is holding the parts of the box blank firmly together, it will be noticed that an electric-motor 111 on top of the frame, by means of gearing 112, 113, continuously rotates a properly-journaled shaft 114, which may, if desired, be driven by a belt around its pulley 115 instead of by the electric-motor, and which as occasion demands, may be rotated by its hand-wheel 116.

This constantly-rotating shaft 114, by intermeshing gears, continuously revolves gear 118 by means of gear 117, the hub 119 of the former being freely rotatable on a stationary sleeve or hub 121 keyed at 122 to a bearing of the frame and through which fixed sleeve the shaft 48 passes and in which it has a suitable bearing.

Shaft 114 carries a sliding, toothed clutch-element 123 with a key or spline connection 124 between them and adapted for coactive relation with its companion, toothed clutch-member 125 fixed to a pinion 126 and both freely rotatable on the shaft.

Pinion 126 is in mesh with a small gear 127 below it (Figure 11) and the latter in turn drives a large gear 128 free to rotate on the end portion of shaft 48 (Figure 10), such gear on its inner surface having an interrupted cam rib 129 and within it a suitably-mounted roller 131.

A split, and therefore angularly adjustable, cam 132 is carried on the hub of gear 128 (Figures 10 and 11).

Figure 1:
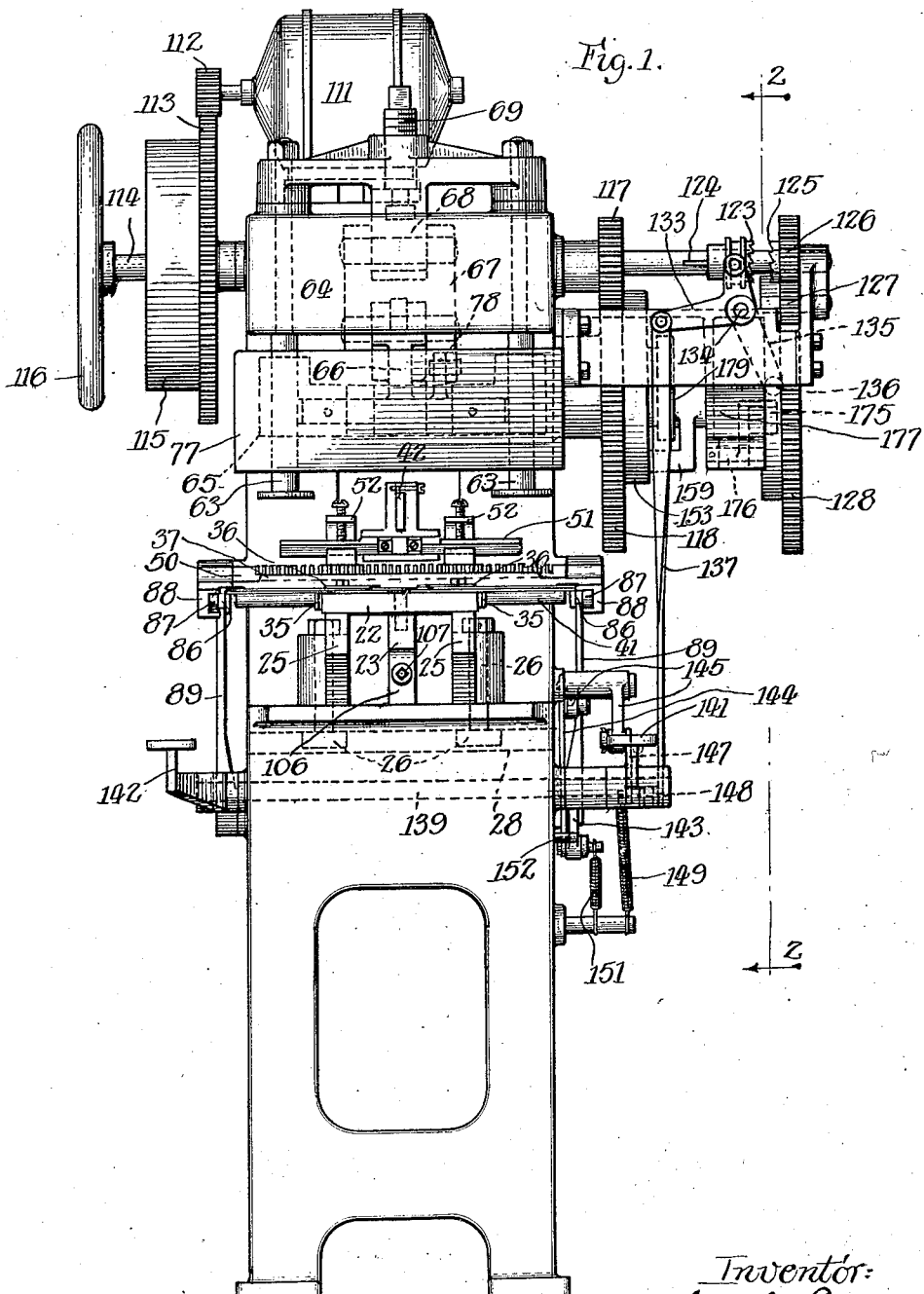
Figure 1 is a front elevation of the new machine.

The slidable clutch-member 123 is adapted to be shifted into coactive relation with its complementary clutch-element 125 by a bell-crank yoke 133 fixed on a rock-shaft 134 journaled in the frame and having a downwardly-extended arm 135 (Figures 1 and 2) carrying a roller 136 which occupies the gap or space in the cam rib 129 when clutch 123—125 is separated or inoperative, but which is automatically removed from the cavity to ride on the edge of the cam rib as soon as the clutch is made active by sliding its part 123.

So long, therefore, as this roller travels on the edge of the cam rib during the turning or rotation thereof, the clutch elements will be held together in cooperative or active relation, but when the gap or space in the cam rib comes again into register with the roller, the clutch will be automatically rendered inoperative.

Clutch 123—125 is shifted into action by the following specified cooperating mechanical parts.

The bell-crank clutch-yoke 133 is joined by a link 137 to a lever 138 loose on a shaft 139 and having a forwardly-extended handle 141, whereby, if the handle is permitted to be and is, depressed, the clutch will be made operative.

Shaft 139, at the other side of the frame, (Figure 1) is equipped with a similar forwardly-projecting handle 142 by means of which the shaft may be rocked manually, such shaft having an arm 143 (Figure 2) fixed thereon so as to turn with the shaft, the arm being connected by a link 144 to one arm of a bell-crank 145 fulcrumed on the frame at 146, the other bell-crank arm being pivotally connected to a slotted link 147, the slot of which receives the pivot-pin 148 joining the parts 137 and 138, a coiled contractile spring 149 being fastened at one end to the frame and at its opposite end to the slotted link, another spring 151 being secured to arm 143 and to the frame, a stop or abutment on the frame and projecting into the path of movement of arm 143 limiting the turning movements of the elements involved.

When the clutch is in inoperative position or condition, the link 147 and its arm of the bell-crank 145 are slightly beyond center in which position they are held by the springs and they act as a lock to prevent the manual depression of handle 141.

In order to close the clutch, it is necessary to push down both levers or handles simultaneously which assures that both hands of the operator are required for this action and hence prevents the latter from having either hand where it will be injured or squeezed during the starting of the machine.

When the handle 142 is pressed down, it swings the locking toggle 147, 145 back slightly beyond center, thus unlocking and releasing lever 138, the depression of whose handle 141 slides the clutch into operative relation.

A very slight movement of handle 142 is sufficient for this purpose and the more substantial clutch-actuating operation is carried out by the movement of the other handle 141.

Gear 118 has within its round side drum or flange 153 a pair of semi-circular combined friction clutch and brake elements 154, 155 (Figures 9 and 10) hinged at 156 on a pin whose head 157 is in a slot 158 in an angular arm 159 forming part of a collar 161 keyed or otherwise fixed to the cam-shaft 48.

When this clutch is active, gear 118 revolves shaft 48 through its drum 153, the then-expanded clutch-members 154, 155, arm 159 and collar 161.

Figure 9:
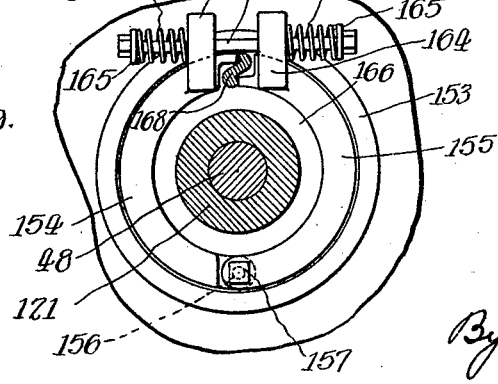
Figure 9 is a cross-section through the friction-clutch and brake appliance on line 9—9 of Figure 10.

As is shown in Figures 2, 3, and 9, the parts 154 and 155 are normally held contracted by a pair of springs 162, 162 encasing a rod 163 extended through aligned holes in lugs or ears 164, 164, outstanding from the two curved clutch-elements, such springs bearing at their inner ends against the ears and pressing at their outer ends against washers 165, 165 on the ends of the rod, all as will be readily understood.

When the parts 154, 155 are permitted to contract, they act as brake-elements bearing on the periphery of a disc 166 forming part of the stationary sleeve 121 and tend to quickly stop the rotation of shaft 48 under such circumstances.

This friction clutch may be made operative by turning a short shaft 167 mounted in the collar 161 and having a reduced end 168 of the shape shown in cross-section in Figure 9 between the slightly-separated adjacent ends of the semi-circular clutch-parts 154 and 155 which are spread apart by such shaft section against the action of the springs, hence causing them to frictionally grip the inside of the gear drum 153.

Shaft 167 has loosely mounted thereon the two separated legs of a yoke 169 (Figures 2, 3 and 10), and has fixed thereon an arm 171 provided with an adjustment screw 172 through a threaded hole in the arm 171 and bearing on the yoke, whereby the latter may be said to be fixed adjustably to the shaft, which it is adapted to turn to control the condition of the clutch.

Yoke 169, at one end, has a roller 173 designed to coact with a curved projection 174 on the side of a lever 175 (Figure 11) fulcrumed at 176 on a stationary bracket 177 depending from the frame of the machine, such lever being in the path of travel of, and hence designed to be rocked upwardly by, the roller 131 on gear 128.

Yoke 169 at its other end has a roller 178 which rides on a stationary cam 179 forming part of the fixed sleeve 121, such cam having two depressions or gaps 181 and 182 into either of which the roller may drop and in so doing throw out the clutch and put on the brake automatically by reason of the springs 162, 162.

*Operation.*—Assuming that the operator has taken a box-blank 29 and folded over the side-wings 31, 31 and bent over the end flaps 33, 33 and applied such blank to the form-block so that the springs 35 and 36 hold the bent sections of the form, then he simultaneously depresses both handles 141 and 142 and thereby shifts the rotating clutch element 123 into engagement with its companion part 125, thus causing the rotation of gear 128.

Clutch 123—125 is maintained operative for one complete revolution of gear 128 and its cam-rib 129, because, as soon as the clutch is made active, it is automatically held in that condition for the specified period by the riding of roller 136 on the edge of rib 129.

Stated otherwise, the clutch cannot be thrown out of action until the gap in the rib again comes into register with the roller, whereupon the latter enters such space under the action of springs 149 and 151 and throws the clutch out of operation.

During the rotation of gear 128, roller 131 lifts lever 175 and the latter, through roller 173, rocks yoke 169 and its shaft 167, thereby spreading apart the hinged clutch-members 154 and 155 into frictional engagement with the inner surface of drum 153 of gear 118, whereby the latter, which is constantly rotating, revolves cam-shaft 48 through the clutch and collar 161, which, with its yoke, rotates the shaft.

The adhesive appliers advance in a straight line, during the rotation of shaft 48, being fully wiped by the resilient comb which leaves adequate material on the bottom faces of their spaced blades, all other adhesive being scraped off, until they come over the flaps 33, 33, whereupon they descend by reason of the rocking of bar 42 and deposit their charges of adhesive in narrow, parallel strips on the top surfaces of such flaps.

Then the adhesive appliers ascend and retreat at a higher elevation to escape the rubber wiper on such back stroke.

Now the presser 77 rocks or turns down folding the flap 34 down over the underlying wings or ears 33, 33, and, thereupon, the toggle comes into action to force the presser down vertically with full pressure on the part 34 to cause its secure adhesion to the coated sections 33, 33.

The stripper-bar recedes just in time to avoid conflict with any of the other mechanical elements and of course its holding function under those circumstances need be no further prolonged.

When the presser reaches its fully depressed position, roller 178 enters the cavity 182 allowing yoke 169 to rock sufficiently to release the friction-clutch 153, 154, 155 and automatically apply the brake 154, 155, 166, so that cam-shaft 48 stops with the presser down exerting its full force on the flap 34.

This pressing of the box parts together, to assure their full and complete adhesion, continues with shaft 48 stationary until cam 132 lifts lever 175 and rocks the yoke 169 upwardly to take off the brake and render the friction-clutch active again.

Cam 132 is of sufficient size or width to hold the yoke 169 elevated until roller 178 has passed beyond the recess 182, whereupon the clutch is held or maintained in operation by roller 178 traveling on the stationary cam 179 until it reaches cavity 181 from which it started, and, upon entering such depression, the clutch is thrown out of operation and the brake again set into action, the machine then having completed its single cycle of operation.

It may be noticed that for each such cycle of operation of the mechanism, gear 128 makes one complete revolution and shaft 48 completes one, interrupted, single turn, but at different speeds, because of the differences in the sizes of the gears 117, 126 and 127.

During the partial rotation of the cam-shaft, after its period of idleness, the presser rises and swings up to its original elevated position, and, at about the same time, the adhesive-appliers descend into the vessel to obtain their new supply of cementitious material, and, then, they rise and remain still in position ready to advance and be wiped during the next succeeding cycle of action of the machine.

As soon as the presser rises sufficiently, the stripper-bar comes forward and discharges the partly-completed box from the form-block and then recedes into proper position for cooperative holding action on the next blank or the opposite end of the same blank under consideration.

It will be observed, that the machine acts on only one end of the blank at a time and that the latter has to be reversed by hand in order that the other end may be formed and secured in shape.

By adjusting the angular position of cam 132 on the hub of gear 128, the length of the period that the presser acts on the flaps may be varied as required, because the location of such cam determines the length of time of idleness of the cam-shaft 48, the beginning of such period being fixed by the definite location of cam cavity 182.

Those skilled in this art will readily understand that the invention is not limited and restricted to the precise and exact mechanical details illustrated and described and that the invention is susceptible of incorporation in several dfferent physical forms all embodying the fundamental principles of the invention, or, stated somewhat differently, many minor mechanical changes may be made in the mechanism presented without departure from the heart and essence of the invention as defined by the appended claims, and without the loss of any of the material benefits and advantages of the invention.

I claim:

1. In a pasteboard box-making machine, the combination of a form-block about which the box-blank is adapted to be folded, a presser constructed to move toward and from said form-block to press and secure together adhesive-coated parts of the box-blank, means to actuate said presser including a clutch, and means to throw said clutch out of action automatically temporarily with the presser in position squeezing said box-parts together.

2. In a pasteboard box-making machine, the combination of a form-block about which the box-blank is adapted to be folded, a presser constructed to move toward and from said form-block to press and secure together adhesive-coated parts of the box-blank, means to actuate said presser including a toggle and a clutch, and means to throw said clutch automatically temporarily out of action with the toggle straightened to hold the presser firmly in position squeezing such box-parts together.

3. In a pasteboard box-making machine, the combination of a form-block about which the box-blank is adapted to be folded, a presser constructed to move toward and from said form-block to press and secure together adhesive-coated parts of the box-blank, means to actuate said presser including a clutch, a brake for said actuating means, and automatic means to throw said clutch out of action temporarily and apply the brake with the presser in position squeezing said box parts together.

4. In a pasteboard box-making machine, the combination of a form-block about which the box-blank is adapted to be folded, a presser constructed to move toward and from said form-block to press and secure together adhesive-coated parts of the box-blank, means to actuate said presser including a first clutch, means to throw said clutch out of operation automatically with the presser in position squeezing such box parts together, means including a second clutch to restore said first clutch to operative condition after a period of time, means to render both clutches inoperative when the machine has completed its cycle of operations.

5. In a pasteboard box-making machine, the combination of a form-block about which the box-blank is adapted to be folded, a stripper designed to discharge the box from said form-block, means to actuate said stripper to discharge the box, and means to adjust the position of said stripper without modifying the length or position of its discharging stroke.

6. In a pasteboard box-making machine, the combination of a form-block about which the box-blank is adapted to be folded, a stripper designed to discharge the box from said form-block, means to actuate said stripper to discharge the box, and adjustable balanced springs determining the original position of said stripper.

7. In a pasteboard box-making machine, the combination of a form-block about which the box-blank is adapted to be folded, a stripper designed to discharge the box from said form-block, means to operate said stripper including a rock-shaft, an apertured arm rigid with said shaft, a rod extended through the aperture of said arm, balanced springs around said rod bearing at their ends on opposite sides of said arm and against abutments on said rod, and means to adjust said rod to vary the original position of said stripper.

In witness whereof I have hereunto set my hand.

ARTHUR J. EVERS.